United States Patent [19]

Pacanowsky

[11] Patent Number: 5,022,096
[45] Date of Patent: Jun. 11, 1991

[54] WATERPROOF BREATHABLE WADER
[75] Inventor: David J. Pacanowsky, Elkton, Md.
[73] Assignee: W. L. Gore & Associates, Inc., Newark, Del.
[21] Appl. No.: 467,069
[22] Filed: Jan. 18, 1990
[51] Int. Cl.$^5$ .............................................. A41D 1/06
[52] U.S. Cl. .............................................. 2/227; 2/82
[58] Field of Search ................ 2/22, 79, 82, 227, 232, 2/242; 36/1.5, 2 A, 2 B, 2 R

[56] References Cited

U.S. PATENT DOCUMENTS

| Des. 285,140 | 8/1986 | Ellenberger | D 2/29 |
|---|---|---|---|
| 1,264,123 | 4/1918 | Pepper | 2/227 |
| 1,488,536 | 4/1924 | Fry | 2/227 |
| 2,570,019 | 10/1951 | Wolk | 2/82 |
| 3,268,914 | 8/1966 | Barber | 2/227 |
| 3,953,566 | 4/1976 | Gore | 264/288 |
| 4,044,478 | 8/1977 | Girard | 36/1.5 |
| 4,117,609 | 10/1978 | Helt | 2/227 |
| 4,187,390 | 2/1980 | Gore | 174/102 R |
| 4,194,041 | 3/1980 | Gore et al. | 428/315 |
| 4,194,308 | 3/1980 | Karlsson | 36/9 R |
| 4,443,511 | 4/1984 | Worden et al. | 428/196 |
| 4,509,213 | 4/1985 | Harvey | 2/227 |
| 4,809,447 | 3/1989 | Pacanowsky | 36/9 R |
| 4,858,342 | 8/1989 | Nicholson et al. | 36/109 |
| 4,912,860 | 4/1990 | Keller | 2/227 |

FOREIGN PATENT DOCUMENTS 2737756 3/1979 Fed. Rep. of Germany .

OTHER PUBLICATIONS

Cabela's Mail Order Catalogue Fall-1989-pps. 14,15, 98-103.

Primary Examiner—Werner H. Schroeder
Assistant Examiner—Diana L. Biefeld
Attorney, Agent, or Firm—Dena Meyer Weker

[57] ABSTRACT

A multicomponent, waterproof, breathable wader comprising right and left panels, each panel having a shape of a legging with an upper and lower region, the upper regions of the right and left panel joined together at a seam running from front to back, means for supporting the seamed panels on a person, said means attached to the upper regions of each panel; the front and back regions of each panel joined to form pant legs, and socks attached to the lower region of each pant leg by a seam.

The means for supporting the seamed panels on a person include belts or suspenders.

7 Claims, 3 Drawing Sheets

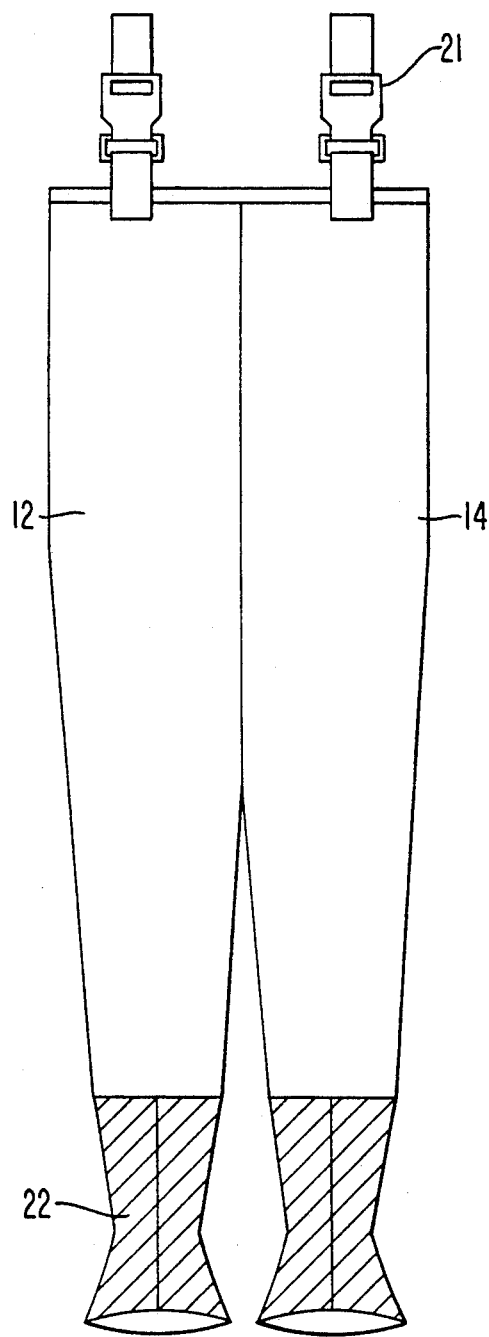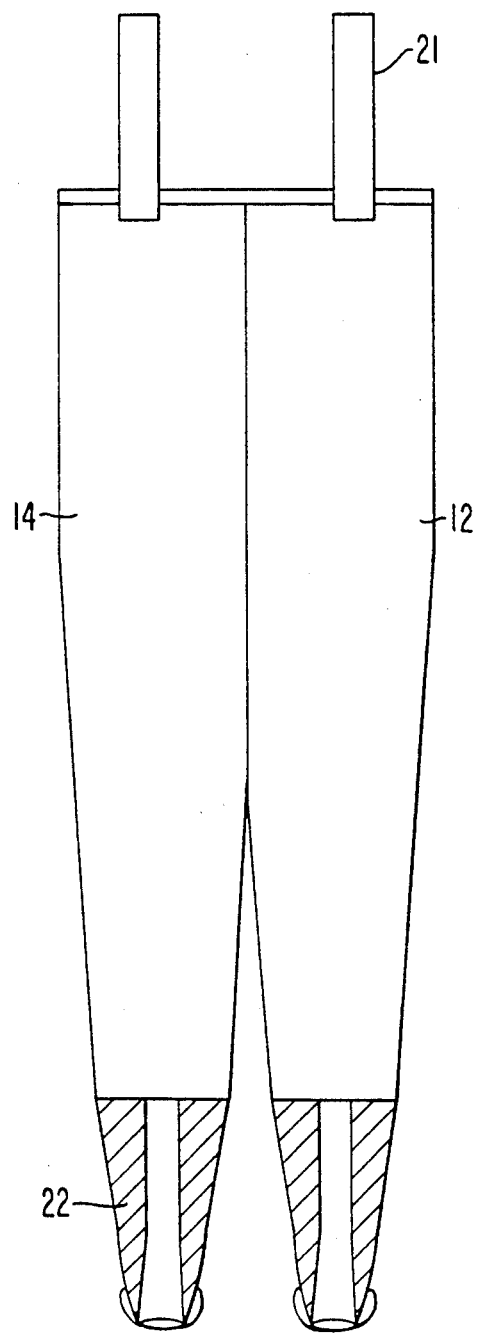

WATERPROOF BREATHABLE WADER

BACKGROUND OF THE INVENTION:

The present invention relates to improved waterproof breathable waders.

Waders are long waterproof pants that have shoes, boots or booties attached and are most often used by fishermen and hunters. There exist many problems with these garments in that they are made of rubber and other materials that are impermeable but not breathable. Thus they retain water and moisture resulting in a "clammy" feeling and are also very heavy and cumbersome. Further, the materials used in the commercially available waders deteriorate very quickly as the rubber dry rots and the protective coatings on the nylon abraid readily.

Shoes are also attached to the pant legs which although provides additional waterproof protection to the fisherman, the one piece unit (pants with attached shoes) are often very heavy to carry and are extremely clumsy. Also the one piece units are very bulky and difficult to pack.

U.S. Pat. Nos. 3,953,566 and 4,187,390 disclose a method and article for making a form of expanded polytetrafluoroethylene (PTFE) that has properties of being both waterproof and breathable. U.S. Pat. No. 4,194,041 discloses an improvement on that material. U.S. Pat. No. 4,443,511 describes a method of making stretchable expanded PTFE. The materials of these patents have been used widely in waterproof breathable outdoor garments such as Jackets, pants, gloves, boots, and socks. U.S. Pat. No. 4,809,447 describes a multi-component waterproof, sock-type article having a waterproof, non-elastic, non-stretch sole component with heel and toe, waterproof, non-elastic, non-stretch calf component, and a waterproof, breathable, elastic, stretchable vamp component.

There is a need to provide a lightweight, waterproof and breathable wader for use by fishermen, commercial fishermen, hunters, and backpackers.

SUMMARY OF THE INVENTION

A multicomponent, waterproof breathable wader is provided comprising right and left panels, each panel having a shape of a legging with an upper and lower region, the upper regions of the right and left panels joined together at a seam running from front to back, means for supporting the seamed panels on a person, said means attached to the upper regions of each panel; the right and left legging panels joined along an interior seam to form pant legs, and socks attached to the lower region of each pant leg by a seam between each leg and sock.

The means for supporting the seamed panels on a person include belts or suspenders. The wader components are preferably laminates having a plurality of layers most preferably three-layer laminates. The inside layer of the three-layer laminate is preferably a knit material having a weight of less than about 2 oz./yard$^2$, the middle layer of the three-layer laminate is preferably a waterproof, breathable material such as waterproof breathable porous expanded PTFE. The outer layer of the laminate for all components except sections of the sock is preferably a non-stretch abrasion-resistant woven fabric; the remaining sections of the sock, in particular the vamp region, are preferably a knit material.

BRIEF DESCRIPTION OF THE DRAWINGS

FIG. 4 is a front elevational view of a second embodiment according to the invention.

FIG. 5 is a rear elevational view of a second embodiment of the invention.

DETAILED DESCRIPTION OF THE INVENTION

A multicomponent, waterproof breathable wader is provided comprising right and left panels, each panel having a shape of a legging with an upper and lower region, the upper regions of the right and left panel joined together at a seam running from front to back, and means for supporting the waders on a person, the means attached to the upper regions of the panels., the right and left leggings joined along an interior seam to form pant legs, and socks attached to the lower region of each leg by a seam.

The legging panels, means for supporting the waders on a person and most of the sock components are comprised of a waterproof and breathable, abrasion resistant, non-elastic, non-stretch laminate, preferably a three-layer laminate.

The socks are constructed in a similar manner to those described in U.S. Pat. No. 4,809,447, in which there is a waterproof and breathable non-elastic non-stretch sole component having a heel portion and a toe portion, a waterproof and breathable non-elastic, non-stretch calf component attached to and forming a seam with the sole component at the heel portion, and a vamp component attached to and forming seams with sole and calf components. The vamp component comprises a waterproof, breathable, elastic stretchable material having stretchability of more than 70%.

Essentially all of the seams in the one piece wader suit are seam-sealed with a waterproof material so that they are waterproof. The seams attaching means for supporting the waders need not be seam-sealed. Shoes or boots are not attached to the wader but fit over the socks.

Figure 1:
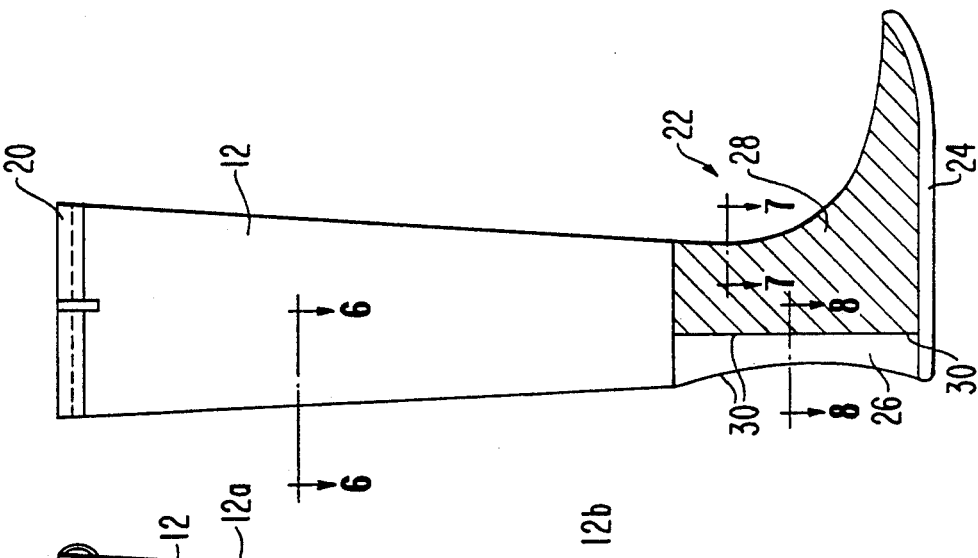
FIG. 1 is a front elevational view of the wader according to the invention.
Figure 2:
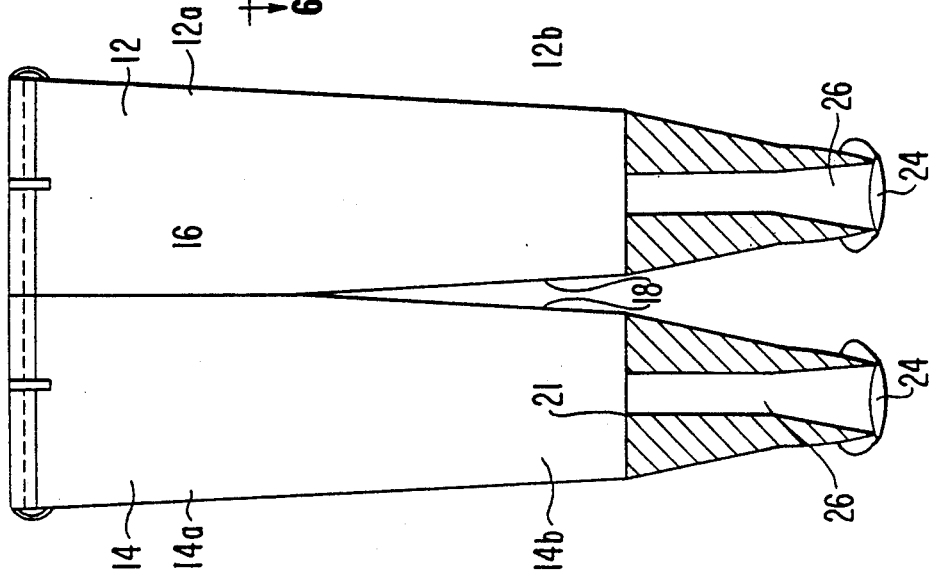
FIG. 2 is a rear elevational view of the wader according to the invention.
Figure 3:
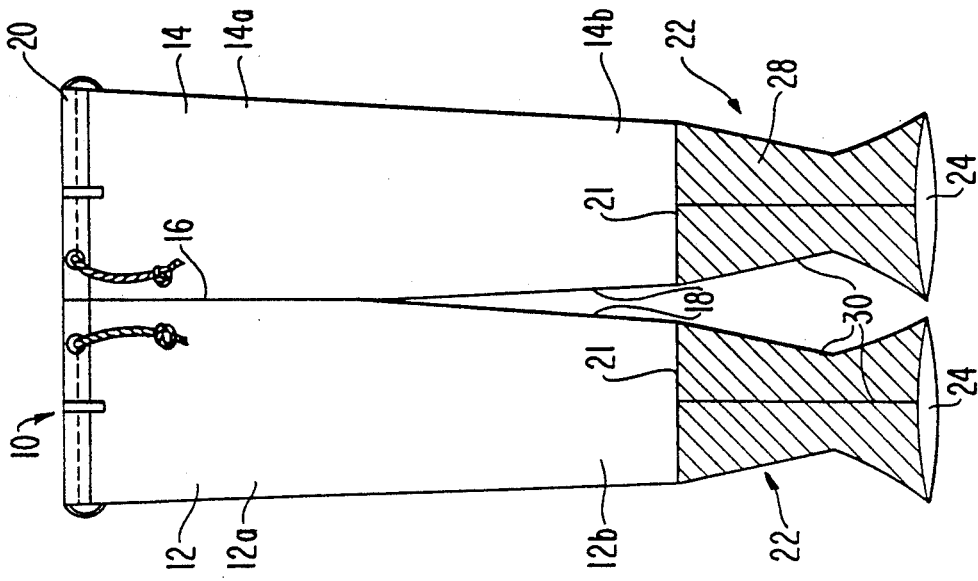
FIG. 3 is a side elevational view of the wader according to the invention.

The invention is best understood by reference to the accompanying drawings. FIGS. 1, 2, and 3 are respectively front, rear, and side elevation views of the first embodiment of the invention. FIG. 1 shows the front view of the wader 10 showing the right 12 and left view of panels 14 in the shape of leggings, each panel having an upper region 12a and 14b. FIG. 1 also shows the seam 16 formed at the connection between the right and left panels. This seam 16 runs from front to rear or vice versa forming a crotch region. FIG. 2 shows seam 16 from the rear.

Each legging panel 12 and 14 are sewn to attach front and back regions by an interior seam 18 thus forming right and left pant legs. Seams 16 and 18 intersect in the crotch region of the waders (not shown in the figures).

The means 20 for supporting the waders on the person include a belt or rope tied through belt loops either around the waist, or around the upper torso, to a height where if the wearer was wading in water, water would not enter the pants. Alternatively, as shown in FIGS. 4 and 5, the means for support may include suspenders 21.

The socks 22 are attached to the lower regions 12b and 14b of each pant leg 12 and 14 by a seam P1 A waterproof and breathable, non-stretch, non-elastic material is used in the sole and heel 24, and calf portions 26 (shown in FIGS. 2 and 3) of the sock. A waterproof and breathable elastic material is employed in the front vamp portion 28 to provide ease of donning and doffing the sock and also to provide a good fit. FIG. 3 shows a side elevational view of the wader with the lower region of the pant leg 12b attached to sock. The figure also shows the construction of sock 22 with sole 24, vamp 28 and calf portion 26 all attached together at seams 30.

Figure 6:
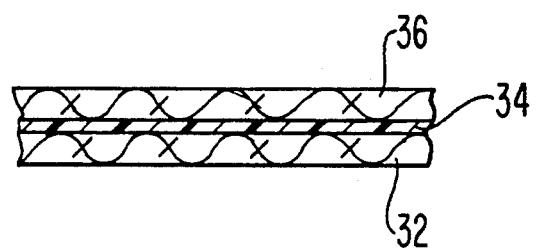
FIG. 6 is a cross-sectional view of the non-stretch laminate used in the invention taken along line 6—6 of FIG. 3.

FIG. 6, taken along line 6—6 of FIG. 3, shows a preferred three-layer laminate of the waterproof and breathable non-stretch. non-elastic material used in the invention. Outer layer 32 is an abrasion resistant woven fabric, preferably woven nylon. Middle layer 34 is waterproof, breathable material, most preferably porous expanded PTFE. Inner layer 36 is a knit material, preferably of nylon tricot knit having a weight of less than about 2 oz./yd.$^2$. The waterproof breathable non-stretch laminate is employed for use in the right and left legging panels as well as several sock components.

Figure 7:
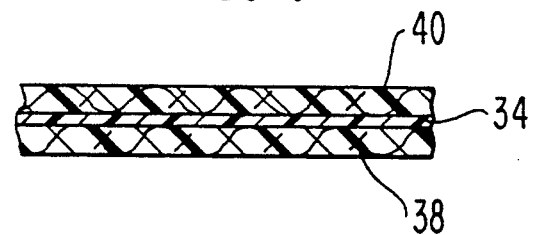
FIG. 7 is a cross-sectional view of the stretch laminate used in the invention taken along line 7—7 of FIG. 3.

FIG. 7, taken along line 7—7 of FIG. 3 shows a preferred three-layer laminate of the stretchable elastic material used in the invention. Therein outer layer 38 is preferably nylon stretch knit, middle layer 34 is most preferably stretchable, porous, expanded PTFE as disclosed in U.S. Pat. No. 4,443,511 and inner layer 40 is preferably nylon stretch knit.

Figure 8:
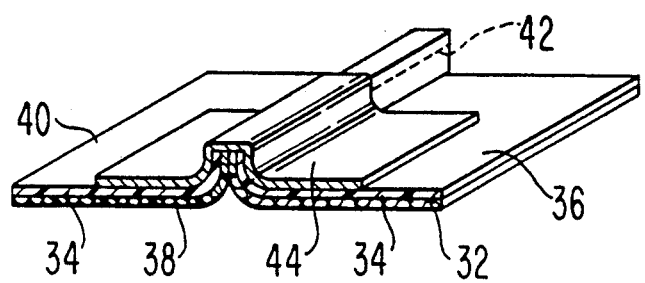
FIG. 8 is a cross-sectional view of the non-stretch laminate attached to the stretch laminate at a seam used in the invention taken along line 8-8 of FIG. 3.

FIG. 8 shows a sealed seam according to the invention taken along line 8—8 of FIG. 3. Therein, the stretchable laminate is shown stitched by thread 42 to the non-stretch laminate and the holes and gaps in the seam are sealed with tape 44. Tape 44 is preferably GORE-SEAM TM tape available from W. L. Gore & Associates, Inc., Elkton, Md. The majority of the seams {i.e. all except for the belt or suspender} formed in the connection of components of the wader are seam-sealed to ensure a waterproof construction.

The construction of the multicomponent wader is fairly simple. The two panels are first attached at the upper region by seam 16. A second interior seam 18 is then made to attach the front region and back region of each panel to form pant legs.

The socks are made by forming seams between the vamp and calf components on each side of a sock and additional seams between the sole and the vamp and the sole and the calf in accordance with the teachings of U.S. Pat. No. 4,809,447. The sock seams are further seam-sealed in accordance with the teachings of U.S. Pat. No. 4,809,447.

One sock is then attached to each pant leg by forming a seam between the periphery of the upper region of the sock and the periphery of the lower region of the pant leg. All seams of the waders except for those required in the means for supporting the wader are seam-sealed with seam tape. The sequence of seam-sealing these areas may vary according to the preferences of the manufacturer.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims herein below.

What is claimed is:

1. A multicomponent, waterproof, wader comprising:
   (a) waterproof, breathable, non-elastic, non-stretch right and left panels, each panel having a shape of a legging with an upper and lower region and front and rear region;
   (b) the upper regions of the right and left panels joined together at a seam;
   (c) the front and back regions of each legging panel joined together at an interior seam forming right and left pant legs;
   (d) a waterproof and breathable sock attached to the lower region of each pant leg at a seam and wherein each sock has a waterproof, breathable stretchable vamp region;
   (e) and means for supporting the wader on a person wearing it; wherein substantially all seams in said wader are sealed with a waterproof material.

2. The wader of claim 1 in which each wader component of the right and left panels and socks are laminates having a plurality of layers.

3. The wader of claim 2 in which each of said laminates are three-layer laminates.

4. The wader of claim 3 in which the middle layer of each of said three-layer laminates is a waterproof, breathable material.

5. The wader of claim 4 in which said waterproof breathable material is porous, expanded polytetrafluoroethylene, 6. The wader of claim 1 wherein said means for supporting said wader on a person is a belt contained within belt loops around the person's torso.

7. The wader of claim 1 wherein said means for supporting said wader on a person include suspenders.

* * * * *